United States Patent [19]

Albright

[11] 4,161,200
[45] Jul. 17, 1979

[54] TREE HARVESTER AND BUNCHER

[76] Inventor: Alva Z. Albright, 6407 Masonic Dr., Alexandria, La. 71301

[21] Appl. No.: 802,708

[22] Filed: Jun. 2, 1977

[51] Int. Cl.² .............................................. A01G 23/08
[52] U.S. Cl. ................................. 144/34 R; 144/3 D
[58] Field of Search .................... 144/2 Z, 3 D, 34 R, 144/34 B, 309 AC; 83/102, 107, 175

[56] References Cited

U.S. PATENT DOCUMENTS

| | | | |
|---|---|---|---|
| 3,140,736 | 7/1964 | Propst | 144/34 R X |
| 3,269,436 | 8/1966 | Moore | 144/34 R |
| 3,643,712 | 2/1972 | Doel et al. | 144/3 D X |
| 3,991,799 | 11/1976 | Albright | 144/3 D |
| 4,013,106 | 3/1977 | Albright | 144/3 D |

*Primary Examiner*—Robert L. Spruill
*Assistant Examiner*—W. D. Bray
*Attorney, Agent, or Firm*—James B. Lake, Jr.

[57] ABSTRACT

An improved harvester and buncher of the horizontally articulated type having base and upper structure such as described in my prior invention of Apparatus and Method of Felling and Bunching Trees, U.S. Pat. No. 3,991,799. Base structure has been reshaped forwardly as a three dimensional wedge for the removal of fallen trees, debris and snow from the cutting path of a chain saw mounted therein and from around a tree, and enclosed for better protection of the chain saw and hydraulic apparatus therefor. The three dimensional wedge defines a center front recess for receiving a tree, and a contact point above the cutting line of the chain saw for limiting tree movement relative to the base. An annular ball bearing connects the invention to a power train while providing for side tilt and pickup, and the center hole of the annular ball bearing allows entrance of hydraulic and control lines where the relative movement is axial. A release mechanism, actuated by the closing of tree grapples, permit the invention to "float" around the annular ball bearing to conform to tree position rather than forcing the tree to conform to the invention. Knives are mounted behind tree grapples to prevent tree slippage when cut. The tree contact points are the back of tree receiving recess above chain saw in the base and the rod end of an hydraulic cylinder in the upper structure which automatically locks to prevent tree movement and signals operator to begin cut with automatic coordination between chain saw, grapples and pivoting on base structure.

1 Claim, 9 Drawing Figures

TREE HARVESTER AND BUNCHER

BACKGROUND OF THE INVENTION

The invention relates generally to harvesting and bunching threes and more particularly to improved apparatus therefor that renders the operations more safe, economical and rapid.

The closest prior art is the U.S. Pat. No. 3,991,799 for Apparatus and Method of Felling and Bunching Trees issued to the applicant, this application being for improvements thereon.

SUMMARY OF THE INVENTION

An object of the invention is to provide wedge shaped base structure for removal of fallen trees and litter from around a tree to be harvested and bunched.

Another object of the invention is to provide procedure signals to operator to begin cutting operation when a tree is properly and safely engaged for cutting.

Another object of the invention is to provide improved tilting and connecting means for conforming the harvester to a tree for cutting, and for connecting the harvester to a power train.

Another object of the invention is to provide improved routing of power lines from power train to the harvester through a connecting annular bearing.

Another object of the invention is to provide information to the operator through feedback during operation of the invention of the progress of cutting a tree.

Another object of the invention is to provide improved safeguards in the operation of the chain saw and apparatus controls.

Another object of the invention is to provide additional safety means for preventing slippage of trees during and after cutting and for recovery therefrom if a slippage should occur.

DETAILED DESCRIPTION OF THE INVENTION

Figure 1:
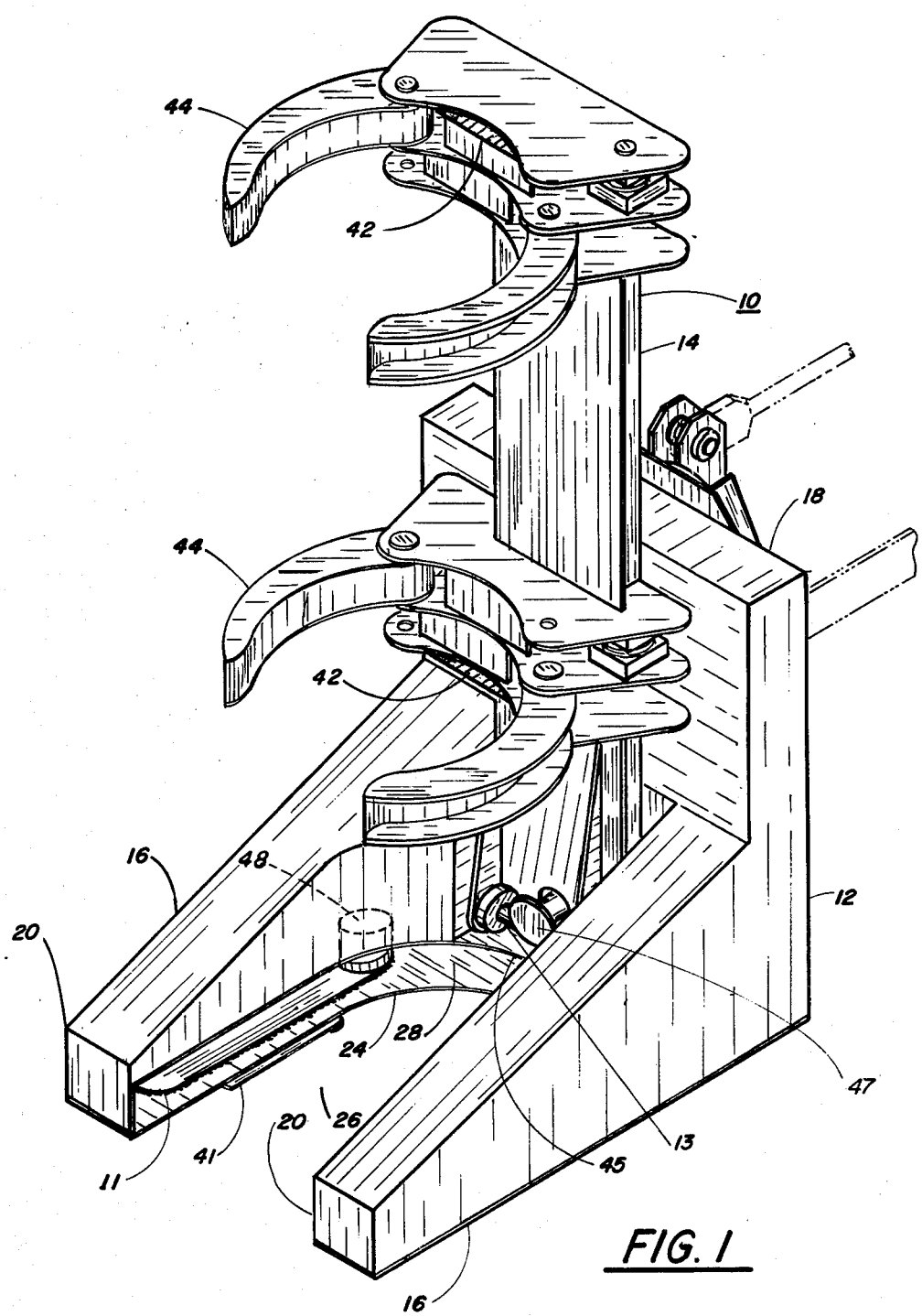
FIG. 1 is a three dimensional view from the side and top of the invention.
Figure 2:
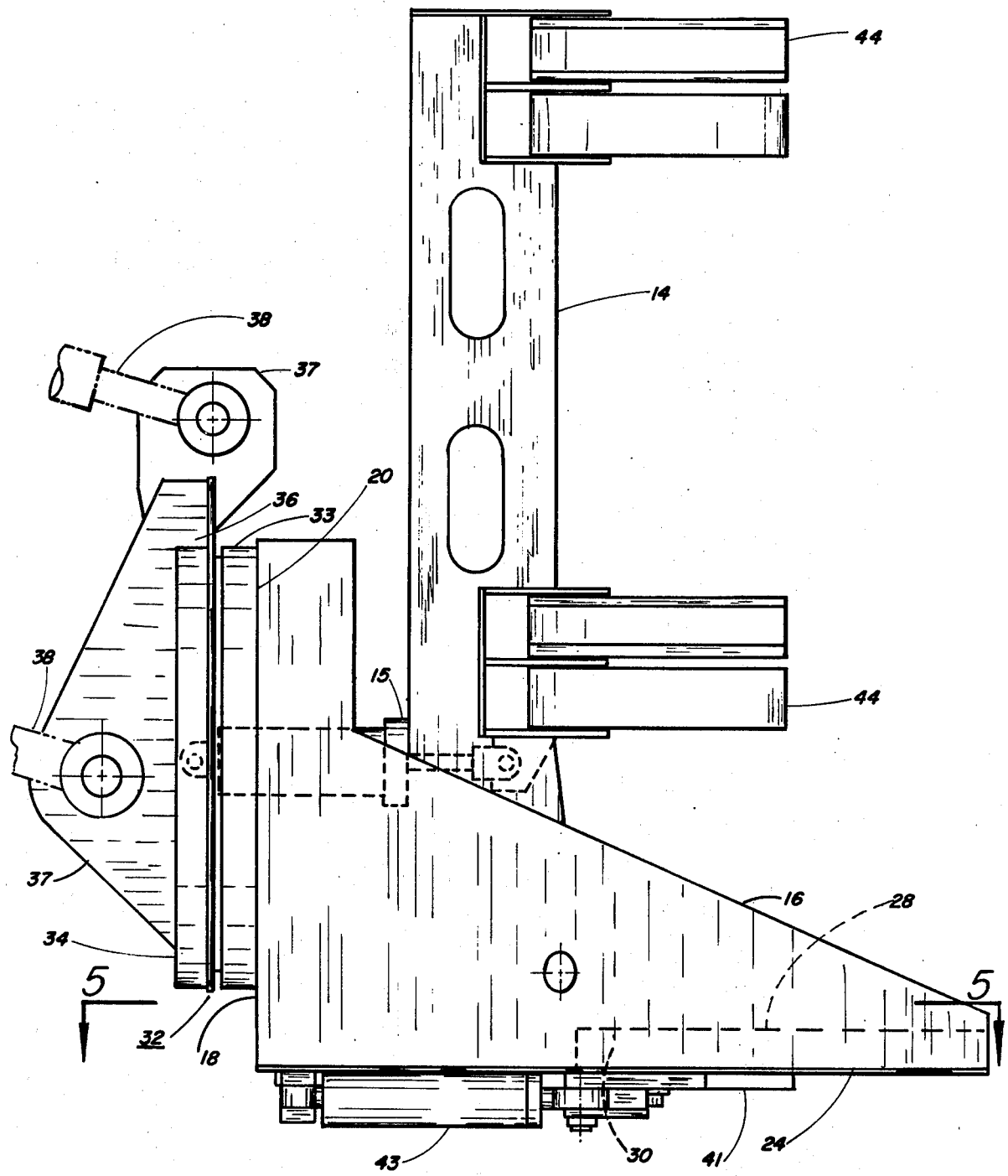
FIG. 2 is a side elevation of the invention.
Figure 3:
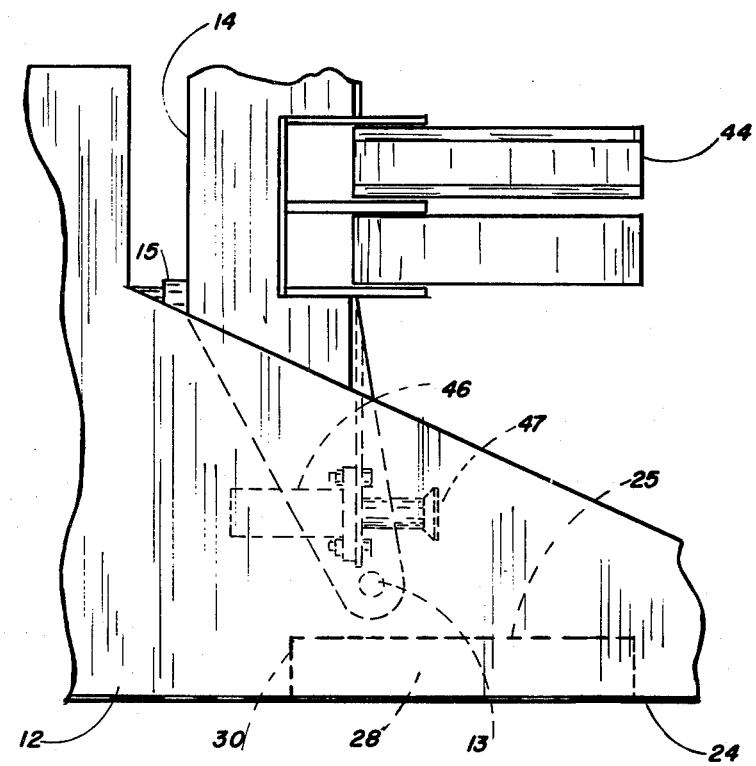
FIG. 3 is a partial side elevation of the junction of the base and upper structure and in phantom a tree engaging hydraulic cylinder rod end.
Figure 4:
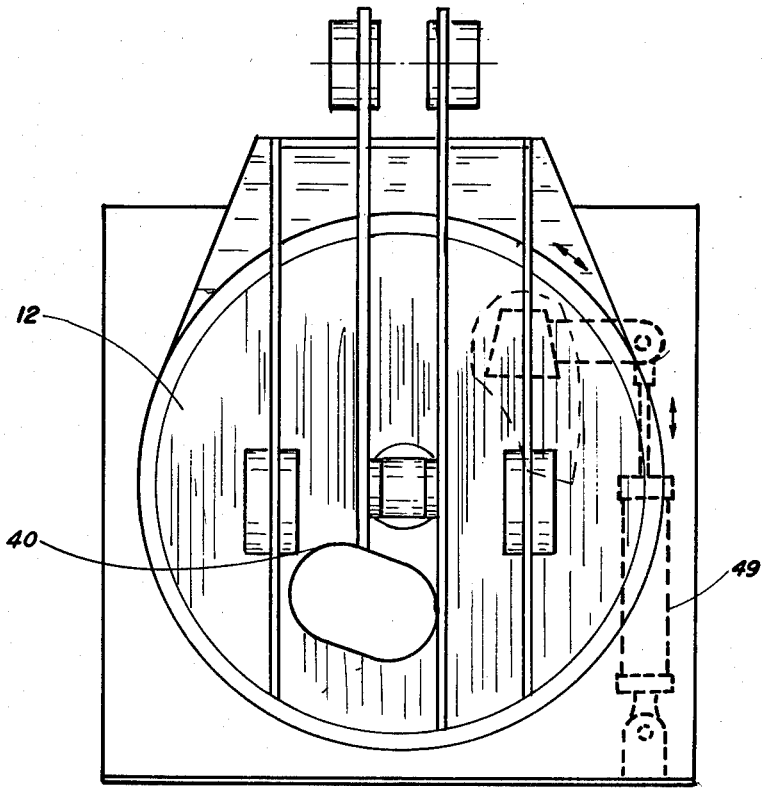
FIG. 4 is a partial rear view of the base structure.
Figure 5:
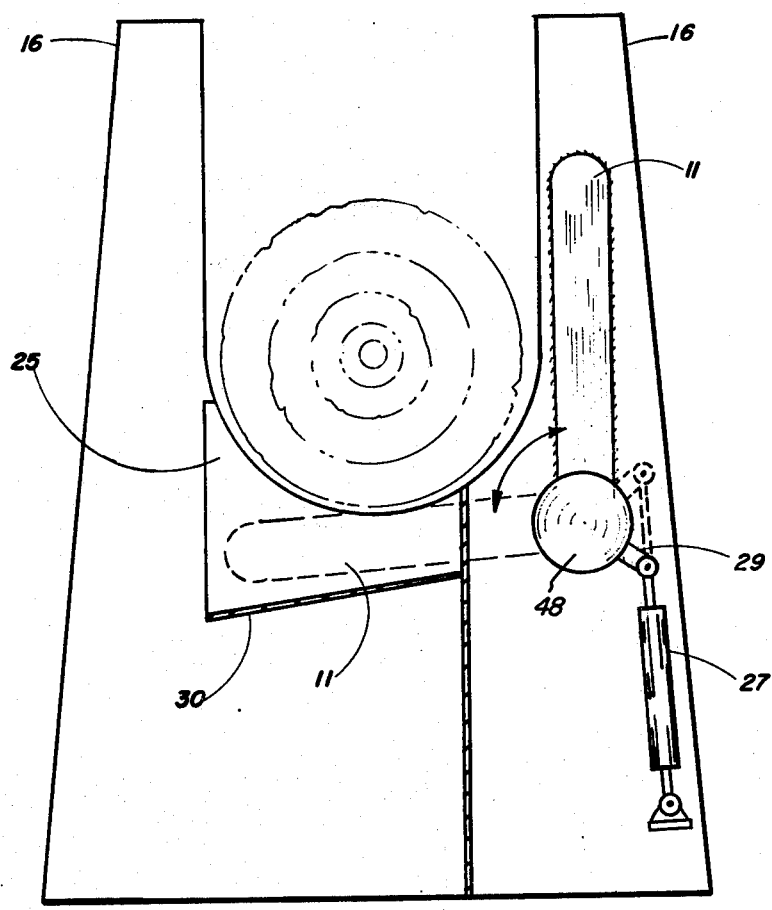
FIG. 5 is a sectional view along section lines 5—5 of FIG. 2.

Referring to FIGS. 1–5, the invention comprises an improved tree harvester and buncher 10 of the horizontally articulated type for use with a power train having an auxiliary hydraulic power source. A chain saw 11 is mounted in a base structure 12 to which is pivoted at pivots 13 an upper structure 14, such as described in my U.S. Pat. No. 3,991,799 for Apparatus and Method of Felling and Bunching Trees. An hydraulic double acting cylinder 15 connected between base structure 12 and upper structure 14 pivots said upper structure on said base structure.

Base structure 12 has been improved by restructuring it to define a wedge shape in three dimensions with stationary arms 16 forwardly extending from a high wide back portion 18 to a low narrow front portion 20, for removing fallen trees, debris and snow from around a tree to be cut. A bottom plate 24 secured to the base structure closes all of the bottom thereof except for a tree receiving recess 26 opening forwardly and defined between the two stationary arms 16. A pocket 28 opening forwardly is defined behind recess 26 for receiving saw chain 11 at the end of a cutting swing actuated by hydraulic cylinder 27 having its rod end pivoted to lever 29 that is rigid with chain saw 11. A rear wall 30 seals the rear of pocket 28. A large diameter ball bearing 32 is fixed by its races 33 to back portion 18 of the base structure and engages a tilt plate 36 secured to an attaching bracket 37 that is connectable to a front boom 38 (Partially shown) of a power train (not shown). The races 33 and tilt plate 36 define an annular passageway 40 thru said ball bearing to provide a short constant length path for the power and control hoses from the auxiliary hydraulic power source of the power train to the power and control apparatus of the tree harvester and buncher. Stump grippers 41 actuated by hydraulic cylinder 43 are mounted to bottom plate 24 (See FIG. 2).

Upper structure 14 has been improved by mounting knives 42 transversely behind indirectly opposed tree grapples 44 arranged in spaced vertically apart relationship on said upper structure 14 for ensuring against tree slippage in grapples. To further ensure against any movement of the tree in the grapples, base structure 12 engages a tree to be cut at contact point 45 defined by upper plate of the back of tree receiving recess 26 and above the tree cut. Also an hydraulic cylinder 46 has been mounted in the upper structure for its rod end 47 to project into the path of a tree entering recess 26, and, when initially engaged retracts therein until locked by the start of the cutting cycle, as hereinafter explained. Float tilt control hydraulic cylinder 49 floats in the power line and releases said upper structure to tilt around the ball bearing tilting plate as grapples 44 close around said tree and thereby align the tree harvester with said tree rather than pulling the tree into alignment with the harvester.

Figure 6:
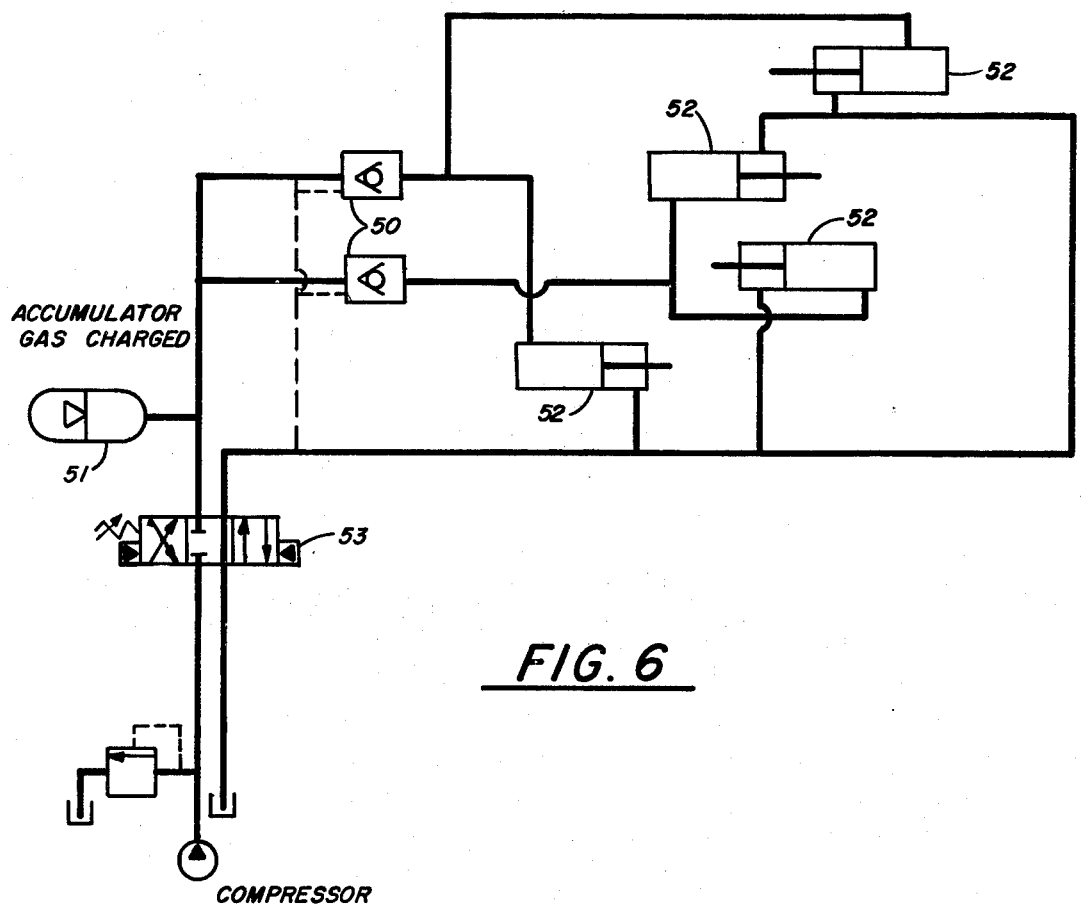
FIG. 6 is a schematic drawing of the grapple hydraulic control system.

Referring to FIGS. 6–9, power actuators of the tree harvester and buncher are hydraulic cylinders with the exception of an hydraulic motor 48 that rotates a saw chain around a saw bar, the two together constituting chain saw 11. In FIG. 6, the hydraulic lines of the grapples actuating cylinders 52 include an accumulator 51 between a control valve 53 and pilots checks 50. When cylinders 52 are actuated to close grapples 44, accumulator 51 is automatically charged as the rod ends of cylinders 52 are projected therefrom, the cylinders' rod ends being open to a reservoir and the other cylinder 52 ends being blocked by pilot operated checks 50, thus preventing any slackening of grapples 44. Check valves 50 lock cylinders 52 by allowing passage of pressure fluid to tighten grapples but not the reverse until signaled.

Figure 7:
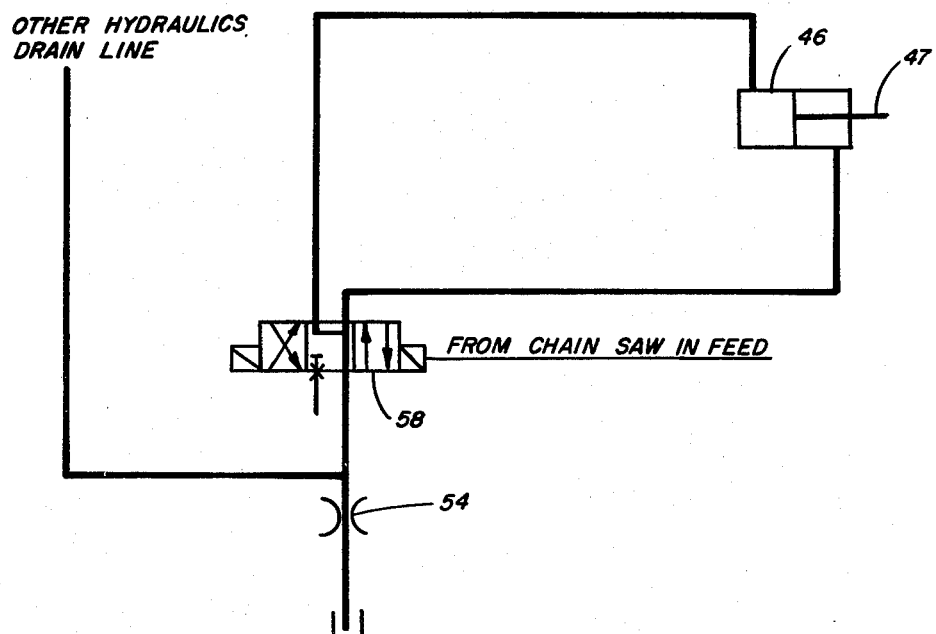
FIG. 7 is a schematic drawing of the hydraulic power and control system for the tree engaging hydraulic cylinder.

In FIG. 7 the additional safety and tree stabilizing feature of the device is shown. As stated above the cylinder 46 is mounted at the lower end of upper structure 14 so the rod end 47 is engaged by a tree in the base structure recess 26 to push an attached piston into cylinder 46. When a cutting cycle starts a valve 58 is closed, and flow from cylinder 46 is blocked thereby holding the butt of the tree in original position when the tree is cut off and grapples 44 pull the tree rearwardly. The force exerted to extend the rod end 47 is the differential between the area of the rod side of the attached piston and the full face of the other side of the piston, both sides being subjected to the same pressure, due to restriction 54 of return to reservoir which provides the same pressure to both ends of cylinders 46.

Figure 8:
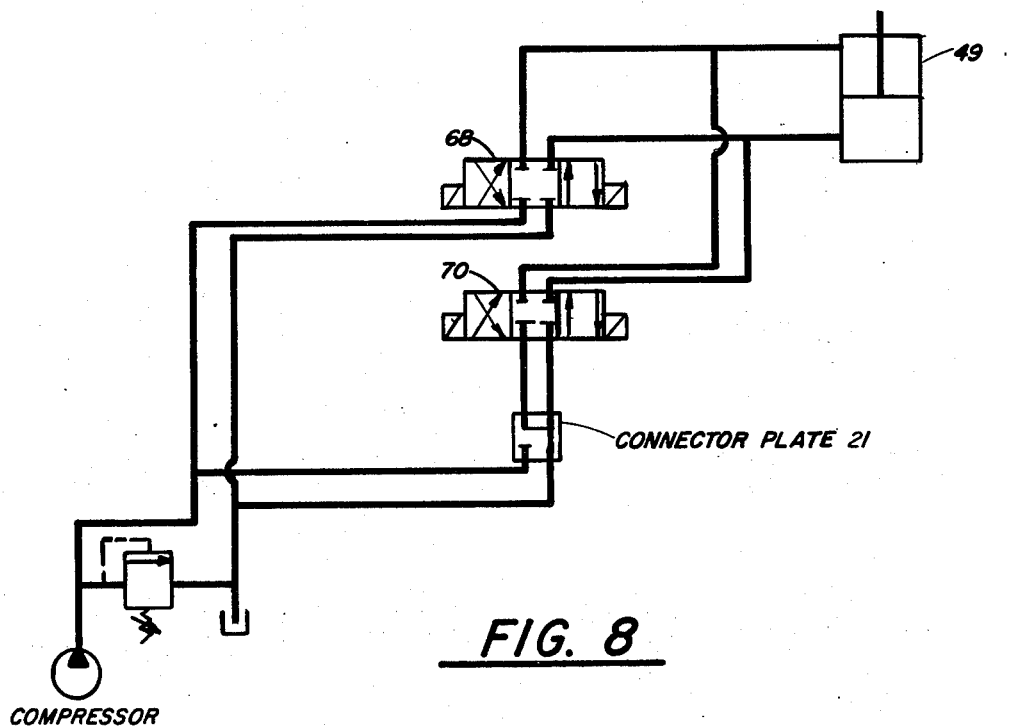
FIG. 8 is a schematic drawing of the power and control system for hydraulically actuating the invention in side tilting around a ball race.

In FIG. 8, the hydraulic system for tilting the harvester from side to side around ball bearing 32 comprises cylinder 49 which is controlled by valve 68 and released by valve 70 as grapples 44 close around a tree and allows the grapples to pull the harvester into alignment with the tree instead of vice versa thus avoiding stressing the tree until it is cut. Connector plate 21 does not transmit pressure to valve 70, instead both pressure and reservoir lines return to reservoir so that actuation of valve 70 causes cylinder 49 to "float". It is not held in position by valving.

Figure 9:
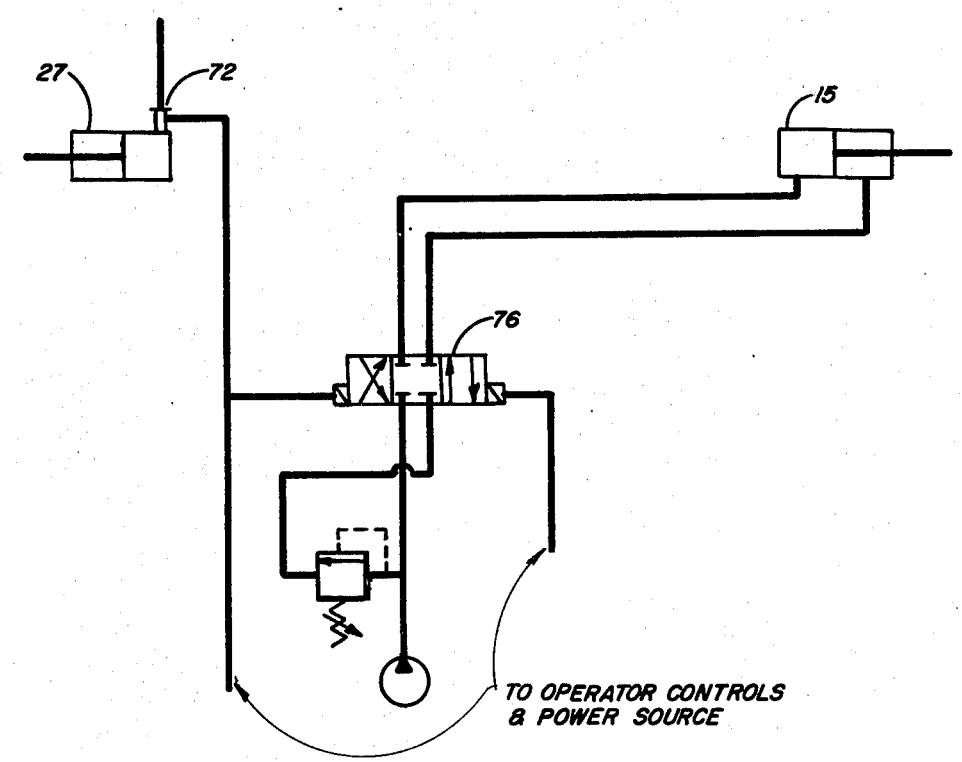
FIG. 9 is a schematic drawing of the hydraulic power and control system for pivoting the upper structure on the base structure of the invention.

In FIG. 9 stressing the cut tree is initiated by a signalling device 72 mounted on an actuating cylinder 27 of chain saw 11 actuating a valve 76 to cause double acting cylinder 15 to pivot articulated upper structure 14 rearwardly just before the tree is completely cut through, thereby opening the cut and slightly lifting the tree to free the chain saw to enter pocket 28 at the end of its cutting swing. Cylinder 27 has five ports, two are for operating the cylinder and the chain saw, the other three are for metal sensing electric switches of signalling device 72 that sense position of internal cylinder parts. One said switch senses the retraction of the piston in said cylinder has started and signals operator and valve 76 that cutting cycle has begun. The second of said switches similarly signals when cut is nearly completed and cylinder is actuated to tilt upper structure back to open cut and slightly lift tree. The third said switch senses the full retraction of piston in cylinder 27 and similarly signals that cut is completed and chain saw is in pocket 28. Switches suitable for the purpose are known to the art as TANN TL-72A. Valve 76 is also controlled by the operator.

What is claimed is:

1. In an improved tree harvester and buncher, having a base structure, with ball-bearing side-tilting means mounted on the back thereof and with a tree-receiving center recess mounted on the front, said base structure being horizontally articulated to an upper structure, and adapted for use with a power train having an auxiliary power supply, said upper structure mounting vertically spaced pairs of tree grapples, and said base structure mounting tree cutting means, controlled power means with sensing and signal means comprising:
   (a) four hydraulic cylinders mounted between said upper structure and said tree grapples for opening and closing the respective arms of said grapples;
   (b) a fifth hydraulic cylinder mounted between said base structure and the tree cutting means for/actuating it in cutting operation with sensing and signalling means mounted on said fifth hydraulic cylinder for sensing and signalling the position of said tree cutting means in its cutting operation;
   (c) a sixth hydraulic cylinder mounted between said ball-bearing side-tilting means and responsive to the closing of said tree grapples to "float" and permit said tree harvester and buncher to conform to the position of an engaged tree;
   (d) a seventh hydraulic cylinder mounted in said upper structure adjacent said base structure and with rod end forward for its rod to project into said center recess and engage a tree therein, and responsive to said sensing and signalling means to freeze in position at the beginning of said tree cutting means cutting operation to hold the butt of said tree in its original position when cut; and
   (e) an eighth hydraulic cylinder mounted between the upper structure and the base structure for pivoting said structures relative to each other, and responsive to said sensing and signalling means to pivot said upper structure rearwardly relatively to said base structure toward the end of said tree cutting means cutting operation.

* * * * *